United States Patent [19]

Dietrich et al.

[11] Patent Number: 4,926,708
[45] Date of Patent: May 22, 1990

[54] APPARATUS FOR CONVERTING ROTARY MOTION INTO AXIAL MOTION

[75] Inventors: Johannes Dietrich, Gilching; Bernd Gombert, Furstenfeldbruck, both of Fed. Rep. of Germany

[73] Assignee: Deutsch Forschungsanstalt fur Luft- und Raumfahrt e.V., Linder Hohe, Fed. Rep. of Germany

[21] Appl. No.: 268,892

[22] Filed: Nov. 8, 1988

[30] Foreign Application Priority Data

Nov. 17, 1987 [DE] Fed. Rep. of Germany ....... 3739059

[51] Int. Cl.$^5$ .............................................. F16H 25/22
[52] U.S. Cl. .................................. 74/424.8 C; 74/458
[58] Field of Search ................... 74/424.8 R, 424.8 C, 74/458, 459

[56] References Cited

U.S. PATENT DOCUMENTS 4,648,285 3/1987 Carson ........................... 74/424.8 C
4,655,100 4/1987 Frederick et al. .............. 74/424.8 C

FOREIGN PATENT DOCUMENTS 1216642 3/1966 Fed. Rep. of Germany .

Primary Examiner—Allan D. Herrmann
Attorney, Agent, or Firm—Browdy and Neimark

[57] ABSTRACT

An apparatus for converting rotary motion into axial motion includes a spindle with an external contour and a nut with an internal profile and interposed contoured rollers which have two different contours, one of which produces an axial connection with the contour of the spindle, and the other of which produces a corresponding axial connection with the contour of the interior of the nut. It is preferred that the contour on the interior of the nut be in the form of relatively coarse grooves of V-shaped cross section, with fine simplex thread on the exterior of the spindle. Coarse grooves corresponding to and fitting the coarse grooves on the interior of the nut, alternating with a number of fine grooves corresponding to the fine simplex thread on the spindle, are provided on the outside of the rollers that are disposed between the spindle and the nut.

3 Claims, 2 Drawing Sheets

FIG. 3a
FIG. 3b
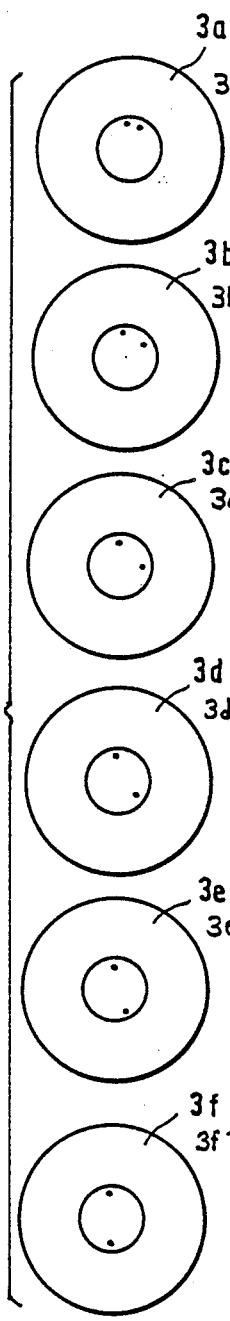
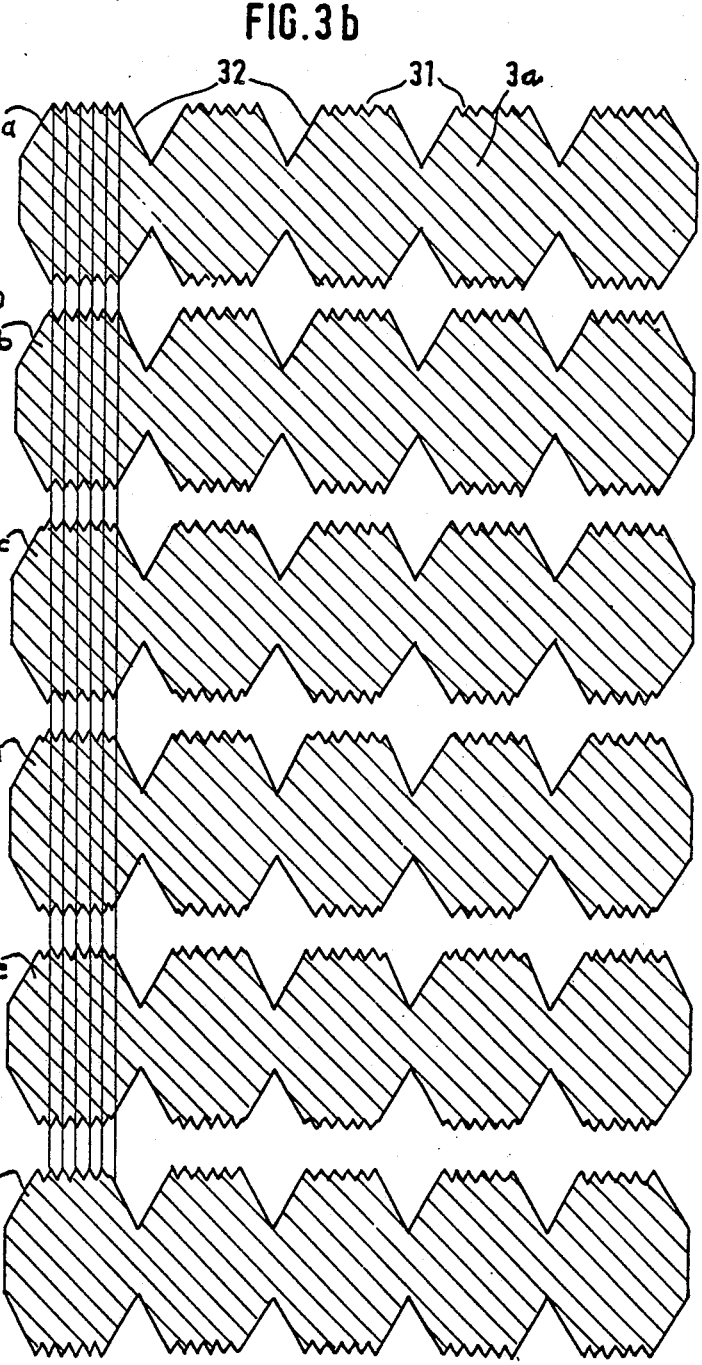

APPARATUS FOR CONVERTING ROTARY MOTION INTO AXIAL MOTION

FIELD OF THE INVENTION

The invention pertains to a device for converting rotary motion into axial motion, and more particularly one having a threaded spindle, an internally contoured nut surrounding the threaded spindle and capable of rotating relative to said spindle, and having a number of interposed contoured rollers.

BACKGROUND OF THE INVENTION

The prior art knows multiple embodiments of so-called roller spindles with ballscrew or planetary roller arrangements. Small pitches are impossible to realize using ballscrew systems as disclosed and specified for example in DT 2,715,762, DE 2,750,054, DE 2,810,001, DT 2,715,761, or DT 2,051,413, because the precision manufacture of balls with a diameter of 0.5 mm or less at reasonable cost is virtually impossible. Furthermore, given the absolute necessity of a ball guide, there are problems with smooth running and ball wear.

Planetary roller spindles, as disclosed and specified for example in DT 2,065,442 and DE 2,838,329, operate with various embodiments of the spindle, roller, and nut components. For example, threads or grooves may be machined on the components. Basically, however, the contours of the rollers engage the contours of both the spindle and nut in order to produce an axial flow of force. Therefore, compatible grooves or threads must be provided on all three components.

In order to prevent or compensate axial wandering of the rollers, so-called stop-motion or resetting devices such as are disclosed and specified in DE 2,320,406, DE 2,823,729, and DT 2,150,739, or toothed rings as presented and described in DT 2,601,493, are provided for forced driving of the rollers.

Likewise, both nuts and rollers can be provided with grooves only, so that the rollers can execute no axial motion, while the spindle is embodied with a multiple thread whose number of threads matches or is a multiple of the number of rollers, as described for example in DE 2,807,952.

In this manner, it is simple to produce roller spindles of higher pitch. However, for roller spindles with a very small pitch, smaller than 0.3 mm/turn, having a useful number of rollers which is more than three, it is necessary to make such fine thread profiles that it is hardly possible to manufacture them in any reasonably economical manner.

Furthermore, DT 2,059,528, DT 2,715,203, and DT 2,721,977 present and specify transmissions, some of which even permit shifting, and which are comprised of the basic components in the roller spindle designs cited above.

In order to translate a rotary motion into an axial motion, various arrangements are devised, often even provided with obliquely disposed ball bearings, as disclosed and specified for example in DE 2,026,550, DT 1,750,637, DE 2,709,006, and DE 3,219,972.

However, the demand for a spindle system with very small pitch, continually reiterated for example in robotics applications, either cannot be met at all by the numerous designs described in many publications, or only at exaggerated expense, or with sacrifices in precision, running smoothness, and service life.

SUMMARY OF THE INVENTION

An object of the invention is thus to develop as frictionless a spindle arrangement as possible that will permit the direct conversion of a rotary motion into an axial motion with a high reduction ratio and high power gain. According to the invention, this is attained by an apparatus for converting rotary motion into axial motion having a threaded spindle, an internally contoured nut surrounding the threaded spindle and capable of rotating relative to said spindle, and having a number of interposed contoured rollers, wherein the threaded spindle (1) has a simplex or multiplex fine thread (10) on an outside surface thereof, the interior contour of the nut (2) that can rotate relative to the spindle comprises relatively coarse grooves (20), the rollers (3) have two differing contours (31; 32) on alternating sections whereby one contour (31) fits the fine thread (10) on the spindle (1) and another groove contour (32) corresponds to the relatively coarse grooves (20) in the interior of the nut (2), wherein the one contour (31) produces an axial connection with the fine thread (10) on the spindle (1), and the other contour (32) produces an axial connection with the coarse groove contour (20) on the interior of the nut (2).

To attain the above-noted object of the invention, spindle arrangements with a very small thread pitch must be used. Furthermore, a particularly small and compact construction is a condition and precondition if an application in precision mechanics is foreseen, for example in an electrically operated robot gripper with regulable gripping force and position. When providing a very small pitch, high power results from the high reduction ratio.

According to a core idea of the invention, two different contours are applied to rollers disposed in planetary fashion between a nut and a spindle. One contour herein produces the axial connection with the spindle, while the other contour effects the axial connection with the grooved nut. In what follows, these distinct contours will be designated the nut-side and the spindle-side contour, respectively.

The nut-side contour of the rollers and the contour within the nut itself have a mucnh larger pitch compared to the spindle-side contour, and preferably have a V-shaped crossection. In order to obtain very small pitches using a cut depth that is feasible at reasonable cost, the spindle-side, circular contours on the rollers, and the helical contours on the spindle itself are embodied as follows. A simplex or multiplex thread is applied to the spindle. The planetary rollers have a pitch corresponding to the spindle thread, embodied in the form of adjacent grooves, wherein these ensure precise engagement into the thread pitch on the spindle. So that all of the planetary rollers will engage precisely into the thread pitch on the spindle, the spindle-side grooves on the individual planetary rollers are disposed with a specific pitch offset from roller to roller, and thus generate a punctiform development of a constant thread pitch from roller to roller.

Hence, due to the pitch offset generated between neighboring planetary rollers and their thus strictly predetermined spacing from each other, each of the planetary rollers executes only a relative rotary motion around the spindle, where they are driven by the thread contour of the spindle. In particular, therefore, no guide cage or roller constraint or resetting is required.

The pitch S for such an arrangement is roughly calculated from the spindle pitch Ss, the radius of the spindle Rs, and the radius of the planetary rollers Rr according to the following equation:

$$S = Ss(1 - Rs/(2Rs + 2Rr)) \quad (1)$$

A further embodiment has substantially the same construction as specified above; however, reversed from the above, the planetary rollers are provided with a thread having a positive or negative pitch, and, on analogy with the idea of the invention, the spindle is provided with grooves. The nut-side guide grooves on the rollers and the corresponding guide grooves in the nut remain as specified above. However, a cage is then required to keep the planetary rollers at an angular distance from one another.

The pitch S for such an arrangement is calculated according to the equation reproduced below.

$$s = Ss(1 - Rs/(2Rs + 2Rr)) + Sr \cdot Rs/Rr \quad (2)$$

In such an arrangement, practically any pitch, even negative pitches, can be realized by varying the roller pitch Sr, without the necessity of changing the spindle pitch or making it negative.

Below, a particularly advantageous, especially frictionless embodiment for very small pitches is described with reference to a preferred embodiment.

DETAILED DESCRIPTION OF THE PREFERRED EMBODIMENTS

Figure 1:
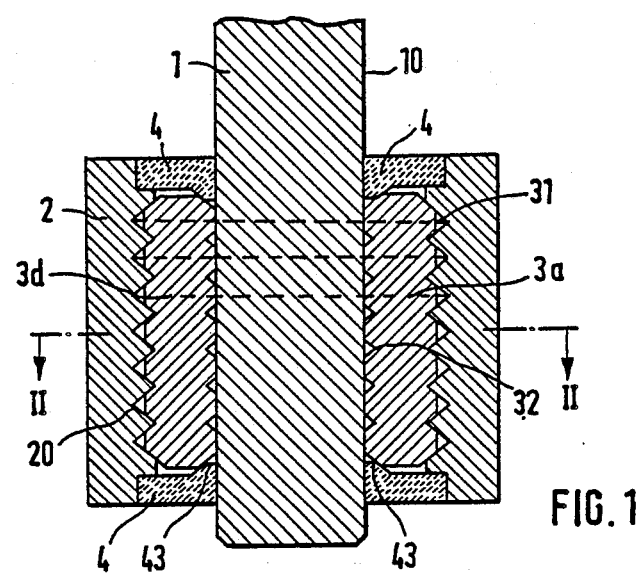
FIG. 1 shows an axial sectional view of a preferred embodiment of the apparatus according to the invention.
Figure 2:
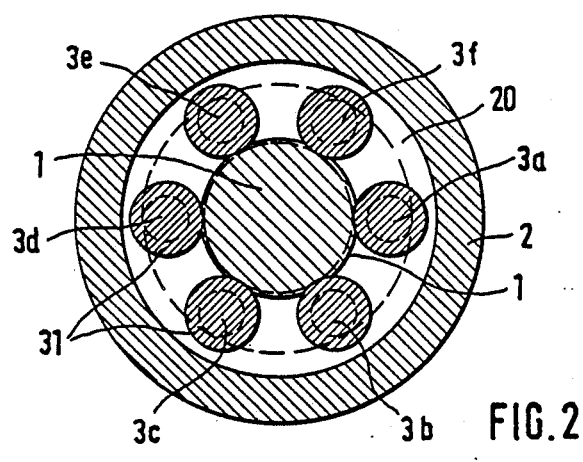
FIG. 2 shows a sectional view along line II—II in FIG. 1, and FIG. 3a and FIG. 3b shows an "opened-up view" of a preferred embodiment with six planetary rollers reproduced in top view and sectional view respectively, wherein the latter shows a pitch offset from roller to roller in the spindle-side contour provided.

A spindle 1 or, respectively, the end of a shaft embodied as spindle 1, for example the shaft of a drive motor, is presented in the center of both in the axial sectional view in FIG. 1 and in the sectional view in FIG. 2 along line II—II in FIG. 1. A simplex fine thread 10 having a pitch S of 0.3 to 0.25 mm or less is applied to such a spindle 1.

Disposed around spindle 1 are a multiplicity of rollers 3, in the present embodiment six of them, as in especially obvious from the sectional view in FIG. 2. A correspondingly fine groove contour 31 consisting of adjacently located and parallel grooves of specific pitch is applied to predetermined sections of the so-called planetary rollers 3a to 3f, so that this constant groove pitch and groove depth ensure precise engagement into the small-pitch thread 10 on the spindle 1.

Furthermore, coarse guide grooves 32 with a V-shaped crosssection are formed on the individual planetary rollers 3a to 3f between the sections with the spindle-side groove contour; the pitch of these guide grooves is precisely the same as that of negative guide grooves 20 with a V-shaped cross-section that are formed in the interior of the spindle nut 2.

So that all of the six planetary rollers 3a to 3f in the present embodiment will precisely and reliably engage into both the nut-side groove contour of specific pitch in the interior of the nut 2 and also into the spindle 1 having small thread pitch, the spindle-side groove contour 31 is disposed on each of the planetary rollers 3 with a partial displacement that is constant from roller to roller and depending on the total pitch to be obtained.

In the preferred embodiment shown in FIGS. 3a and 3b, said preferred embodiment having six rollers 3a to 3f, the sectional view shows that the first fine groove in each of the individual sections provided with a fine contour has a partial displacement or a pitch offset, respectively, from roller to roller. With a fine thread pitch of 0.3 on the spindle and a corresponding pitch to the grooves, this would mean a pitch displacement or offset, respectively, of 0.05 mm from roller to roller, or, in angular measure, 60 degrees of angle. Since in the case of such a small thread pitch and consequent small groove depth it is impossible to detect such an offset with the naked eye, the rollers 3a to 3f, or, respectively, their installation sequence, are identified e.g. by dots at various spacings, as the top views in FIG. 3a of the sectional views show.

This means that each of the rollers 3a to 3f has a different pitch offset with respect to the fine contour 31 formed in the intermediate sections provided on them, and hence must be installed in a very specific sequence that can be identified, e.g., from the marking on the face of the individual rollers 3a to 3f.

So, for example, there are 180 degrees of angle between the offset of the fine thread 31 on the roller 3a located on the right in FIG. 1 or 2, corresponding to the topmost roller 3a in FIGS. 3a and 3b, and the corresponding pitch offset in the corresponding first groove on the left roller 3d shown in the sectional view in FIG. 1 or 2, which roller corresponds—counting from the top—to the fourth roller in FIGS. 3a and 3b, since, as has already been mentioned above, a total of six rollers 3a to 3f are provided in the embodiments shown in the Figures.

Expressed another way, the pitch offset of the first groove in each of the contours 31 provided on the rollers, said pitch offset differing from roller to roller, is the product of ((the number of rollers in question)−1)×360°/(total number of rollers), if one begins counting with a specific roller.

The sectional view shown in FIG. 1 of the apparatus according to the invention also has one cover 4 each above and below for protection from dust, as a retainer and to secure the rollers 3a to 3f, which covers have bulges 43 facing the interior of the arrangement, the bevel on which bulges corresponds to the pitch of the coarse grooves 32 on the outside circumference of the rollers or barrels 3.

Thus, although the illustrated embodiments show six rollers, it will be understood that a fewer or greater number can be used. Also, wereas the illustrated embodiments show the rollers to have a smaller diameter than length, it will be understood that the relative dimensions may be varied and that the roller may have a greater diameter and a lesser length. The foregoing description of the specific embodiments will so fully reveal the general nature of the invention that others can, by applying current knowledge, readily modify and/or adapt for various aplications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. Apparatus for converting rotary motion into axial motion, having a threaded spindle, an internally contoured nut surrounding the threaded spindle and capable of rotating relative to said spindle, and having a number of interposed contour rollers, wherein the threaded spindle (1) has a simplex or multiplex fine thread (10) on an outside surface thereof, the interior contour of the nut (2) that can rotate relative to the spindle comprises relatively coarse grooves (20), the rollers (3a to 3f) have two differing contours (31; 32) on alternating sections whereby one contour (31) fits the fine thread (10) on the spindle (1) and another groove contour (32) corresponds to the relatively coarse grooves (20) in the interior of the nut (2), wherein the one contour (31) produces the axial connection with the fine thread (10) on the spindle (1), and the other contour (32) produces the axial connection with the coarse groove contour (20) on the interior of the nut (2).

2. Apparatus for converting rotary motion into axial motion, according to claim 1, wherein that the contour on the interior of the nut (2) comprises relatively coarse grooves (20) running adjacent to each other and having a V-shaped cross-section, the outside of the spindle (1) has a simplex fine thread (10), and in that a specific number of fine grooves (31) fitting the simplex fine thread (10) on the spindle (1) are formed on the outside of the rollers (3a to 3f) in sections alternating with coarse grooves (32) corresponding to and fitting the coarse grooves (20) that run adjacent to each other on the interior of the matrix.

3. Apparatus according to claim 2, wherein in order to precisely establish the position of the individual rollers, the coarse grooves (32) have an offset relative to the specific number of fine grooves (31) on each of the rollers (3a to 3f), said offset differing from roller to roller but corresponding with the number of rollers used, said offset being fixed and predetermined, so that the rollers (3a to 3f), which differ with respect to their pitch offset, are installed in a very specific sequence between the threaded spindle (1) and the nut (2) partially surrounding said spindle.

* * * * *